United States Patent
Yang et al.

(10) Patent No.: US 12,395,293 B2
(45) Date of Patent: Aug. 19, 2025

(54) SIGNAL TRANSMISSION METHOD, INFORMATION INDICATION METHOD, AND COMMUNICATIONS DEVICE FOR DETERMINING A SIGNAL TRANSMISSION PATH

(71) Applicant: VIVO MOBILE COMMUNICATION CO., LTD., Dongguan (CN)

(72) Inventors: Kun Yang, Dongguan (CN); Dajie Jiang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 380 days.

(21) Appl. No.: 17/939,927

(22) Filed: Sep. 7, 2022

(65) Prior Publication Data
US 2023/0006791 A1 Jan. 5, 2023

Related U.S. Application Data

(63) Continuation of application No. PCT/CN2021/078853, filed on Mar. 3, 2021.

(30) Foreign Application Priority Data

Mar. 9, 2020 (CN) .......................... 202010158878.3

(51) Int. Cl.
H04L 5/00 (2006.01)
H04W 72/0453 (2023.01)
H04W 76/11 (2018.01)

(52) U.S. Cl.
CPC ....... *H04L 5/0048* (2013.01); *H04W 72/0453* (2013.01); *H04W 76/11* (2018.02)

(58) Field of Classification Search
CPC ............ H04B 7/04013; H04B 7/15528; H04L 5/0048; H04W 16/26; H04W 72/0453; H04W 76/11; H04W 88/04
See application file for complete search history.

(56) References Cited

U.S. PATENT DOCUMENTS 8,396,984 B2 * 3/2013 Van Datta ............... H04L 45/02
709/243
8,446,933 B2 * 5/2013 Wentink ............ H04W 52/0258
375/220
(Continued)

FOREIGN PATENT DOCUMENTS

CN 103596251 A 2/2014
CN 105246027 A 1/2016
(Continued)

OTHER PUBLICATIONS

International Search Report issued in corresponding International Application No. PCT/CN2021/078853, mailed May 25, 2021, 4 pages.
(Continued)

*Primary Examiner* — Dung B Huynh
(74) *Attorney, Agent, or Firm* — IPX PLLC

(57) ABSTRACT

A signal transmission method, an information indication method, and a related device are provided. The signal transmission method includes: obtaining operating parameter indication information of a second device; and transmitting/receiving a first signal to/from a third device based on the operating parameter indication information, where the transmitting/receiving a first signal to/from a third device includes transmitting/receiving the first signal to/from the third device via the second device, or the transmitting/receiving a first signal to/from a third device includes transmitting/receiving the first signal to/from the third device directly.

19 Claims, 4 Drawing Sheets

(56) References Cited

U.S. PATENT DOCUMENTS

| | | | | |
|---|---|---|---|---|
| 8,468,252 B2* | 6/2013 | Ayyagari | H04B 3/54 | 709/227 |
| 8,605,670 B2* | 12/2013 | Jo | H04B 7/2606 | 370/332 |
| 8,825,040 B2* | 9/2014 | Hooli | H04W 72/02 | 455/435.2 |
| 9,094,814 B1* | 7/2015 | Kullman | H04B 7/15528 | |
| 9,253,662 B1* | 2/2016 | Marupaduga | H04W 24/02 | |
| 9,532,296 B2* | 12/2016 | Noh | H04W 40/22 | |
| 9,729,225 B2* | 8/2017 | Waldhauser | H04W 88/04 | |
| 9,973,257 B1* | 5/2018 | Sung | H04B 7/15528 | |
| 10,021,691 B1* | 7/2018 | Marupaduga | H04L 5/0007 | |
| 10,187,810 B1* | 1/2019 | Liu | H04B 7/15528 | |
| 10,225,724 B1* | 3/2019 | Pawar | H04W 76/10 | |
| 10,292,171 B2* | 5/2019 | Kobayashi | H04W 72/541 | |
| 10,568,139 B2* | 2/2020 | Bhargava | H04W 74/0816 | |
| 11,018,752 B2* | 5/2021 | Gharavi | H04W 52/245 | |
| 2003/0103492 A1* | 6/2003 | Tanimoto | H04L 9/40 | 370/351 |
| 2008/0025251 A1* | 1/2008 | Lee | H04L 5/0037 | 370/328 |
| 2009/0156224 A1* | 6/2009 | Matsumaru | H04W 76/23 | 455/450 |
| 2009/0168689 A1* | 7/2009 | Itagaki | H04W 72/542 | 370/315 |
| 2009/0181693 A1* | 7/2009 | So | H04L 45/125 | 455/453 |
| 2009/0227201 A1* | 9/2009 | Imai | H04L 1/0009 | 455/7 |
| 2009/0325480 A1* | 12/2009 | Ji | H04B 7/022 | 455/8 |
| 2009/0325482 A1* | 12/2009 | Zhou | H04W 16/14 | 455/25 |
| 2010/0008247 A1* | 1/2010 | Kwon | H04L 43/16 | 370/252 |
| 2010/0088427 A1* | 4/2010 | Mo | H04L 45/00 | 709/241 |
| 2010/0159824 A1* | 6/2010 | Goodjohn | H04W 72/0453 | 455/7 |
| 2010/0303032 A1* | 12/2010 | Seo | H04B 7/026 | 370/329 |
| 2010/0329148 A1* | 12/2010 | Won | H04B 7/15557 | 370/254 |
| 2011/0092154 A1* | 4/2011 | Horiuchi | H04W 72/02 | 455/7 |
| 2011/0110340 A1* | 5/2011 | Lakkis | H04W 72/0446 | 370/336 |
| 2011/0117907 A1* | 5/2011 | Hooli | H04W 72/02 | 455/422.1 |
| 2011/0136525 A1* | 6/2011 | Fujii | H04B 7/15592 | 455/507 |
| 2011/0216676 A1* | 9/2011 | Li | H04L 1/1812 | 370/312 |
| 2011/0255462 A1* | 10/2011 | Jo | H04W 36/20 | 370/315 |
| 2012/0023248 A1* | 1/2012 | Bae | H04L 67/06 | 709/230 |
| 2012/0057489 A1* | 3/2012 | Shiotsuki | H04W 40/12 | 370/252 |
| 2012/0182930 A1* | 7/2012 | Sawai | H04L 5/0051 | 370/315 |
| 2012/0287807 A1* | 11/2012 | Yamasaki | H04W 40/12 | 370/252 |
| 2012/0307718 A1* | 12/2012 | Nakasato | H04W 56/0045 | 370/315 |
| 2012/0320763 A1* | 12/2012 | Hong | H04W 24/10 | 370/246 |
| 2013/0021962 A1* | 1/2013 | Hu | H04W 28/0861 | 370/315 |
| 2013/0028168 A1* | 1/2013 | Hirai | H04W 52/04 | 370/315 |
| 2013/0035090 A1* | 2/2013 | Moshfeghi | H04W 52/46 | 455/11.1 |
| 2013/0039201 A1* | 2/2013 | Kwon | H04L 5/14 | 370/252 |
| 2013/0242793 A1* | 9/2013 | Lu | H04B 7/15557 | 370/252 |
| 2014/0179276 A1* | 6/2014 | Kang | H04W 12/06 | 455/39 |
| 2014/0241235 A1* | 8/2014 | Speight | H04W 52/50 | 370/315 |
| 2014/0329477 A1* | 11/2014 | Ling | H04B 7/2606 | 455/90.3 |
| 2015/0149917 A1* | 5/2015 | Tanaka | H04L 67/02 | 715/738 |
| 2015/0181022 A1* | 6/2015 | Vaderna | H04L 41/5003 | 455/422.1 |
| 2015/0230180 A1* | 8/2015 | Lim | H04W 76/14 | 370/315 |
| 2015/0327265 A1* | 11/2015 | Lee | H04W 52/0203 | 370/315 |
| 2016/0037531 A1* | 2/2016 | Lu | H04B 7/15507 | 370/315 |
| 2016/0044613 A1* | 2/2016 | Cai | H04W 88/04 | 370/315 |
| 2016/0212682 A1* | 7/2016 | Chung | H04W 76/14 | |
| 2016/0269486 A1* | 9/2016 | Gupta | H04L 67/12 | |
| 2016/0286564 A1* | 9/2016 | Berggren | H04W 76/15 | |
| 2016/0315690 A1* | 10/2016 | Itagaki | H04W 8/22 | |
| 2016/0316385 A1* | 10/2016 | Larsson | H04B 7/15 | |
| 2016/0337971 A1* | 11/2016 | Bhargava | H04W 52/0216 | |
| 2017/0033858 A1* | 2/2017 | Calcev | H04B 7/155 | |
| 2017/0041919 A1* | 2/2017 | Tanaka | H04W 8/005 | |
| 2017/0078920 A1* | 3/2017 | Li | H04W 28/0808 | |
| 2017/0111273 A1* | 4/2017 | Kuge | H04L 69/22 | |
| 2017/0238226 A1* | 8/2017 | Marque-Pucheu | H04W 36/20 | 370/331 |
| 2017/0251507 A1* | 8/2017 | Fodor | H04W 40/22 | |
| 2017/0265187 A1* | 9/2017 | Chen | H04B 7/15507 | |
| 2017/0359766 A1* | 12/2017 | Agiwal | H04L 5/0048 | |
| 2017/0366958 A1* | 12/2017 | Ryu | H04W 88/04 | |
| 2018/0007095 A1* | 1/2018 | Imai | H04L 65/403 | |
| 2018/0035308 A1* | 2/2018 | Nguyen | H04W 72/1273 | |
| 2018/0035437 A1* | 2/2018 | Kahtava | H04B 7/15528 | |
| 2018/0098290 A1* | 4/2018 | Yu | H04W 52/241 | |
| 2018/0115897 A1* | 4/2018 | Einberg | H04W 12/04 | |
| 2018/0132247 A1* | 5/2018 | Kwon | H04B 1/707 | |
| 2018/0139682 A1* | 5/2018 | Xu | H04W 40/22 | |
| 2018/0139684 A1* | 5/2018 | Aminaka | H04W 40/22 | |
| 2018/0139794 A1* | 5/2018 | Chae | H04W 56/002 | |
| 2018/0146494 A1* | 5/2018 | Khoryaev | H04W 76/15 | |
| 2018/0206176 A1* | 7/2018 | Panteleev | H04W 28/04 | |
| 2018/0206249 A1* | 7/2018 | Hu | H04W 72/0446 | |
| 2018/0249516 A1* | 8/2018 | Jung | H04W 76/11 | |
| 2018/0255505 A1* | 9/2018 | Thyagarajan | H04J 11/0069 | |
| 2018/0278325 A1* | 9/2018 | Feki | H04B 7/2606 | |
| 2018/0310293 A1* | 10/2018 | Lee | H04W 72/20 | |
| 2018/0343556 A1* | 11/2018 | Wang | H04W 40/00 | |
| 2019/0089571 A1* | 3/2019 | Von Novak, III | H04L 1/0003 | |
| 2019/0141771 A1* | 5/2019 | Ma | H04W 76/27 | |
| 2019/0149595 A1* | 5/2019 | Zises | H04L 67/75 | 709/217 |
| 2019/0165848 A1* | 5/2019 | Han | H04W 40/22 | |
| 2019/0208539 A1* | 7/2019 | Christoffersson | H04L 1/0045 | |
| 2019/0223144 A1* | 7/2019 | Yuen | H04W 52/0251 | |
| 2019/0230225 A1* | 7/2019 | Xue | H04W 88/04 | |
| 2019/0230526 A1* | 7/2019 | Visoz | H04W 24/02 | |
| 2019/0281644 A1* | 9/2019 | Hu | H04B 7/15528 | |
| 2019/0289042 A1* | 9/2019 | Perreault | H04L 67/141 | |
| 2019/0341994 A1 | 11/2019 | Ma et al. | | |
| 2019/0387429 A1* | 12/2019 | Basu Mallick | H04W 28/0289 | |
| 2020/0029343 A1* | 1/2020 | Wang | H04L 5/0094 | |
| 2020/0059901 A1* | 2/2020 | Larsson | H04W 88/04 | |
| 2020/0162997 A1* | 5/2020 | Damnjanovic | H04W 48/08 | |
| 2020/0163017 A1* | 5/2020 | Priyanto | H04W 88/04 | |
| 2020/0169318 A1* | 5/2020 | Kim | H04B 17/309 | |
| 2020/0195452 A1* | 6/2020 | Miyamoto | H04L 12/14 | |
| 2020/0221423 A1* | 7/2020 | Wang | H04W 72/02 | |
| 2020/0296795 A1* | 9/2020 | Uchiyama | H04W 4/40 | |

(56) References Cited

U.S. PATENT DOCUMENTS

| | | | |
|---|---|---|---|
| 2020/0304200 A1* | 9/2020 | Ma | H04B 7/18519 |
| 2020/0314927 A1* | 10/2020 | Jeong | H04L 1/0061 |
| 2020/0322811 A1* | 10/2020 | Kang | H04B 7/155 |
| 2020/0396597 A1* | 12/2020 | Damnjanovic | H04W 72/23 |
| 2021/0004544 A1* | 1/2021 | Zhang | G06K 7/10178 |
| 2021/0007104 A1* | 1/2021 | Raghavan | H04W 72/0473 |
| 2021/0105863 A1* | 4/2021 | Martin | H04W 72/542 |
| 2021/0136628 A1* | 5/2021 | Uchiyama | H04W 28/18 |
| 2021/0136655 A1* | 5/2021 | Berggren | H04W 28/0226 |
| 2021/0143896 A1* | 5/2021 | Tao | H04W 48/14 |
| 2021/0144781 A1* | 5/2021 | Xu | H04W 24/02 |
| 2021/0258804 A1* | 8/2021 | Amini | H04W 52/0206 |
| 2022/0377524 A1* | 11/2022 | Ferdi | H04W 8/005 |
| 2022/0393756 A1* | 12/2022 | Matsumura | H04B 7/15514 |
| 2023/0171009 A1* | 6/2023 | Han | H04B 17/15 370/252 |
| 2023/0354144 A1* | 11/2023 | Fu | H04W 40/02 |

FOREIGN PATENT DOCUMENTS

| | | | |
|---|---|---|---|
| CN | 107360635 A | 11/2017 | |
| CN | 109547039 A | 3/2019 | |

OTHER PUBLICATIONS

Extended European Search Report issued in related European Application No. 21767157.7, mailed Aug. 24, 2023, 9 pages.

\* cited by examiner

SIGNAL TRANSMISSION METHOD, INFORMATION INDICATION METHOD, AND COMMUNICATIONS DEVICE FOR DETERMINING A SIGNAL TRANSMISSION PATH

CROSS-REFERENCE TO RELATED APPLICATIONS

This application is a continuation of International Application No. PCT/CN2021/078853, filed Mar. 3, 2021, which claims priority to Chinese Patent Application No. 202010158878.3, filed Mar. 9, 2020. The entire contents of each of the above-referenced applications are expressly incorporated herein by reference.

TECHNICAL FIELD

The present disclosure relates to the field of communications technologies, and in particular, to a signal transmission method, information indication method, and a communications device.

BACKGROUND

In some wireless environments, a communications device may have a change. In different cases, there may be different communications devices in a cell, or a parameter of a communications device when operating may change, where for example, some communications device may change an electromagnetic parameter, a hardware feature, or another function of the communications devices, which affects a channel between the communications devices. However, at present, as communications devices perform signal transmission directly with other communications devices, reliability of signal transmission is relatively poor.

SUMMARY

According to a first aspect, an embodiment of the present disclosure provides a signal transmission method, performed by a first device and including:

obtaining operating parameter indication information of a second device; and transmitting/receiving a first signal to/from a third device based on the operating parameter indication information, where to transmit/receive a first signal to/from a third device includes transmitting/receiving the first signal to/from the third device via the second device, or to transmit/receive a first signal to/from a third device includes transmitting/receiving the first signal to/from the third device directly.

According to a second aspect, an embodiment of the present disclosure provides an information indication method, performed by a second device or a third device and including:

sending operating parameter indication information of the second device to a first device, where the operating parameter indication information is used by the first device to transmit/receive a first signal to/from the third device based on the operating parameter indication information, where that the first device transmits/receives the first signal to/from the third device includes that the first device transmits/receives the first signal to/from the third device via the second device, or that the first device transmits/receives the first signal to/from the third device includes that the first device transmits/receives the first signal to/from the third device directly.

According to a third aspect, an embodiment of the present disclosure provides a communications device, where the communications device is a first device and includes:

an obtaining module, configured to obtain operating parameter indication information of a second device; and a transmission module, configured to transmit/receive a first signal to/from a third device based on the operating parameter indication information, where to transmit/receive a first signal to/from a third device includes transmitting/receiving the first signal to/from the third device via the second device, or to transmit/receive a first signal to/from a third device includes transmitting/receiving the first signal to/from the third device directly.

According to a fourth aspect, an embodiment of the present disclosure provides a communications device, where the communications device is a second device or a third device and includes:

a sending module, configured to send operating parameter indication information of the second device to a first device, where the operating parameter indication information is used by the first device to transmit/receive a first signal to/from the third device based on the operating parameter indication information, where that the first device transmits/receives the first signal to/from the third device includes that the first device transmits/receives the first signal to/from the third device via the second device, or that the first device transmits/receives the first signal to/from the third device includes that the first device transmits/receives the first signal to/from the third device directly.

According to a fifth aspect, an embodiment of the present disclosure provides a communications device, where the communications device is a first device, including a memory, a processor, and a program stored on the memory and executable on the processor, and when the program is executed by the processor, steps of the signal transmission method provided in this embodiment of the present disclosure are implemented.

According to a sixth aspect, an embodiment of the present disclosure provides a communications device, where the communications device is a second device or a third device and includes a memory, a processor, and a program stored on the memory and executable on the processor, and when the program is executed by the processor, steps of the information indication method provided in this embodiment of the present disclosure are implemented.

According to a seventh aspect, an embodiment of the present disclosure provides a computer-readable storage medium, where the computer-readable storage medium stores a computer program, and when the computer program is executed by a processor, steps of the signal transmission method provided in the embodiments of the present disclosure are implemented, or when the computer program is executed by a processor, steps of the information indication method provided in the embodiments of the present disclosure are implemented.

According to an eighth aspect, an embodiment of the present disclosure provides a computer program product, where the computer program product is stored in a computer-readable storage medium, and the computer program product is executed by at least one processor to implement steps of the signal transmission method provided in the embodiments of the present disclosure or steps of the information indication method provided in the embodiments of the present disclosure.

According to a ninth aspect, an embodiment of the present disclosure provides a communications device, where the communications device is a first device, and the communications device is configured to perform steps of the signal transmission method provided in the embodiments of the present disclosure.

According to a tenth aspect, an embodiment of the present disclosure provides a communications device, where the communications device is a second device or a third device, and the communications device is configured to perform steps of the information indication method provided in the embodiments of the present disclosure.

BRIEF DESCRIPTION OF DRAWINGS

To describe the technical solutions in embodiments of the present disclosure more clearly, the following briefly describes the accompanying drawings required for describing the embodiments of the present disclosure. Apparently, the accompanying drawings in the following description show merely some embodiments of the present disclosure and those of ordinary skill in the art may obtain other accompanying drawings from these accompanying drawings.

DETAILED DESCRIPTION

The following clearly describes the technical solutions in embodiments of the present disclosure in conjunction with the accompanying drawings in the embodiments of the present disclosure. Apparently, the described embodiments are some of rather than all embodiments of the present disclosure. All other embodiments obtained by those of ordinary skill in the art based on the embodiments of the present disclosure shall fall within the protection scope of the present disclosure.

The term "comprise/include" and any other variants in the description and the claims of this application mean to cover the non-exclusive inclusion, for example, a process, method, system, product, or device that includes a list of steps or units and is not necessarily limited to those steps or units, but may include other steps or units not expressly listed or inherent to such a process, method, product, or device. In addition, "and/or" used in the description and the claims means at least one of the connected objects. For example, A and/or B represents the following three cases: Only A exists, only B exists, and both A and B exist.

In the embodiments of the present disclosure, words such as "example" or "for example" are used to represent giving an example, an illustration, or description. Any embodiment or design solution described as "exemplary" or "an example" in the embodiments of the present disclosure should not be construed as being more preferred or advantageous than other embodiments or design solutions. To be precise, the use of the words such as "exemplary" or "example" is intended to present a related concept in a specific manner.

The embodiments of the present disclosure are described below in conjunction with the accompanying drawings. A signal transmission method, an information indication method, and a communications device provided in the embodiments of the present disclosure may be performed by a wireless communications system. The wireless communications system may be a New Radio (NR) system, or other systems, such as an Evolved Long Term Evolution (eLTE) system or a Long Term Evolution (LTE) system, or a subsequent evolved communications system. Further, the signal transmission method, the information indication method, and the communications device may be applied to an unlicensed band in the wireless communications system.

Figure 1:
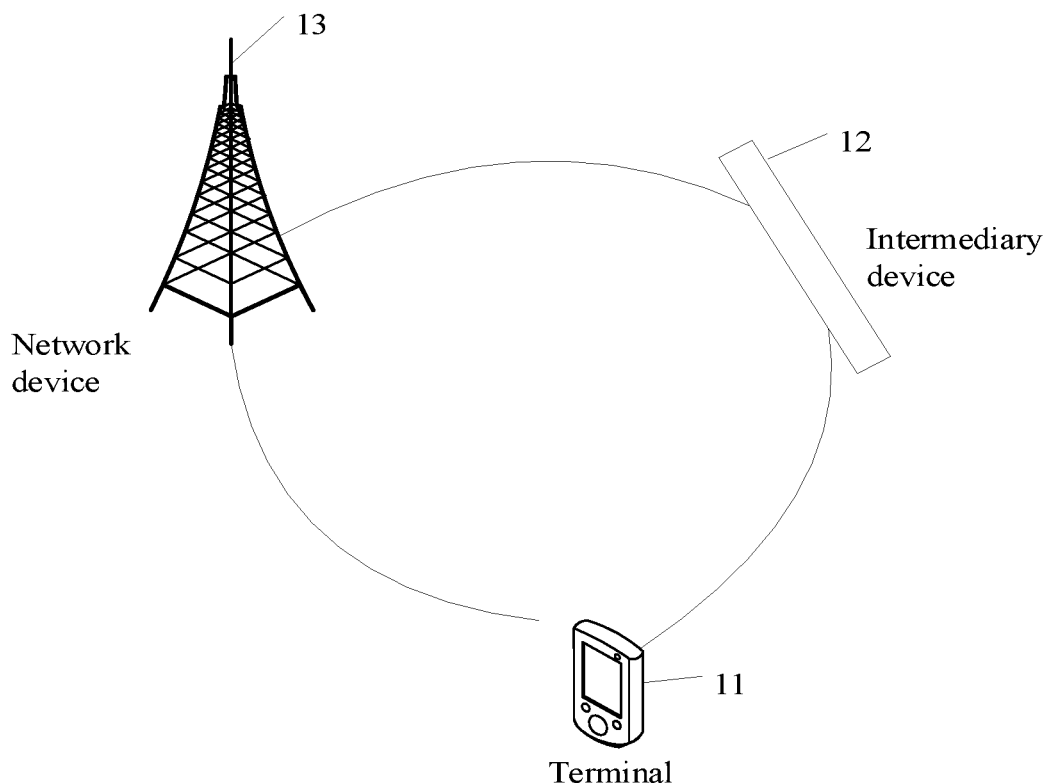
FIG. 1 is a structural diagram of a network system to which the embodiments of the present disclosure can be applied.

Refer to FIG. 1. FIG. 1 is a structural diagram of a network system to which an embodiment of the present disclosure can be applied. As shown in FIG. 1, the network system includes a terminal 11, an intermediary device 12, and a network device 13, where the terminal 11 may be User Equipment (UE) or another terminal side device, for example, a mobile phone, a tablet personal computer, a laptop computer, a personal digital assistant (PDA), a Mobile Internet Device (MID), a wearable device, a robot, or another terminal side device. It should be noted that a specific type of the terminal 11 is not limited in the embodiments of the present disclosure. The intermediary device 12 may be a Large Intelligent Surface (LIS) or another device made of a new metamaterial, a backscatter, a Wi-Fi device, a relay device (for example, a layer 1 relay, an amplify-and-forward relay, or a transparent forwarding relay), or the like. The network device 13 may be a network device, a Wi-Fi device, or a terminal device. The network device may be a base station in 4G or a base station in 5G or later releases, or a base station in other communications systems, or is referred to as a Node B, an evolved Node B, a Transmission Reception Point (TRP), an Access Point (AP), or another term in the field. As long as the same technical effect is achieved, the network device is not limited to a specific technical term. In addition, the network device 13 may be a Master Node (MN) or a Secondary Node (SN).

In this embodiment of the present disclosure, the terminal 11 may communicate with the network device 13 via the intermediary device 12. For example, the intermediary device 12 may forward a signal sent by the terminal 11 to the network device 13, and may forward a signal sent by the network device 13 to the terminal 11. The forwarding performed by the intermediary device 12 may be direct forwarding, transparent forwarding, amplify-and-forward, sending the signal after frequency conversion or modulation, or the like. This is not limited. In this embodiment of the present disclosure, the signal transmitted between the terminal 11 and the intermediary device 12 may be a signal that needs to be transmitted between the terminal 11 and the intermediary device 12, that is, this scenario may not include the network device 13. In addition, the terminal 11 may communicate with the network device 13 directly.

In addition, in this embodiment of the present disclosure, an LIS is a device made of a new man-made material. An LIS can adjust electric and magnetic properties of the LIS dynamically/semi-statically to affect reflection/refraction of electromagnetic waves that are incident upon the LIS, for example, change a frequency, an amplitude, a phase, a direction of polarization, and spatial energy distribution of beams of a reflected/refracted signal. The LIS can control reflected/refracted signals of electromagnetic signals to implement functions such as beam scanning/beam forming.

Figure 2:
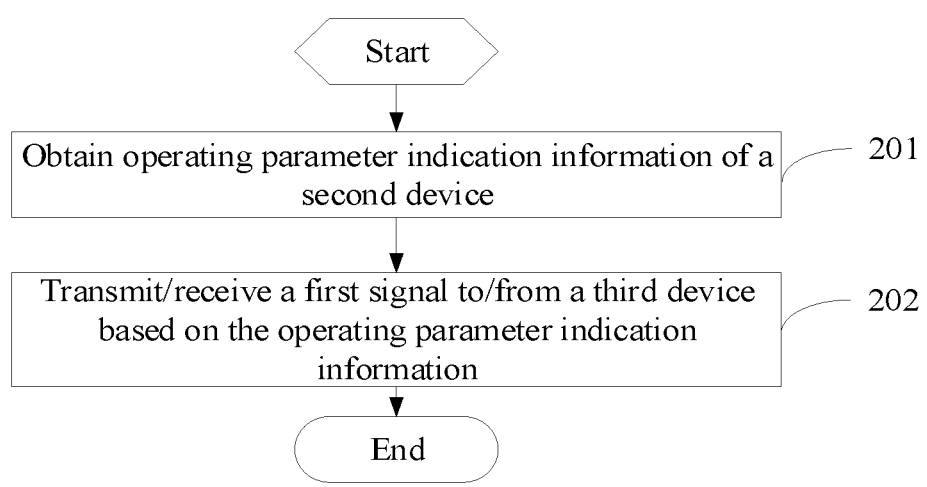
FIG. 2 is a flowchart of a signal transmission method according to an embodiment of the present disclosure.

Refer to FIG. 2. FIG. 2 is a flowchart of a signal transmission method according to an embodiment of the present disclosure. The method is performed by a first device. As shown in FIG. 2, the method includes the following steps:

Step 201: obtaining operating parameter indication information of a second device.

The operating parameter indication information may be obtained by receiving from the first device or by receiving from the second device.

The operating parameter indication information may be used to indicate operating information of the first device in a cell and/or a specific operating parameter of the first device.

Step 202: transmitting/receiving a first signal to/from a third device based on the operating parameter indication information.

To transmit/receive a first signal to/from a third device includes transmitting/receiving the first signal to/from the third device via the second device, or to transmit/receive a first signal to/from a third device includes transmitting/receiving the first signal to/from the third device directly.

The transmitting/receiving the first signal to/from the third device via the second device may be that the first device sends the signal to the third device via the second device, or that the first device receives the signal that is sent by the third device to the first device and that is forwarded by the second device.

In step 202, whether the first signal is transmitted/received to/from the third device via the second device or transmitted/received to/from the third device directly may be determined based on the operating parameter indication information. For example, when it is indicated that there is no second device in a cell or a non-operating resource of the second device is used, the first signal may be transmitted/received to/from the third device directly; or when it is indicated that there is the second device in a cell or an operating resource of the second device is used, the first signal may be transmitted/received to/from the third device via the second device.

In some embodiments, the first signal may be a signal that needs to be transmitted with assistance from the second device or that needs to be forwarded by the second device in order to ensure reliable signal quality of the signal.

In this embodiment of the present disclosure, the first device may include a network device, a Wi-Fi device, or a terminal. The second device may include an LIS, a backscatter, a Wi-Fi device, or a relay device. The third device includes a terminal, a Wi-Fi device, or a network device. In a case in which the first device is a terminal, the third device may be a network device. In a case in which the first device is a network device, the third device may be a terminal. It may alternatively be that in a case in which the first device is a terminal, the third device is also a terminal, and in a case in which the first device is a network device, the third device is also a network device.

Further, the first signal may be a signal sent by the first device to the third device. For example, a terminal receives the first signal forwarded by the second device, and the first signal is sent by a network device to the terminal. In some embodiments, the first signal may be a signal sent by the third device to the first device. For example, a terminal sends the signal to the second device, and then the second device forwards the signal to a network device.

In this embodiment of the present disclosure, as the first signal is transmitted/received to/from the third device based on the operating parameter indication information of the second device, reliability of signal transmission can be improved.

As an optional implementation, the transmitting/receiving a first signal to/from a third device based on the operating parameter indication information includes: transmitting/receiving the first signal to/from the third device via the second device by using an operating resource of the second device, where the operating resource is determined based on the operating parameter indication information.

The operating resource may be a time resource/frequency domain resource or the like determined based on the operating parameter indication information of the second device.

Further, the operating resource of the second device is a state of the second device for forwarding the first signal by using a type of parameter and/or a time resource occupied by the state.

As an optional implementation, the operating parameter indication information includes at least one of the following:

indication information used to indicate whether there is the second device in a cell;

indication information used to indicate a quantity of the second devices in the cell;

indication information used to indicate identifier information of the second device; or indication information used to indicate an operating status of the second device.

When the indication information used to indicate whether there is the second device in a cell is included, as the second device is determined to be in the cell, a terminal transmits/receives the first signal to/from the third device by using an operating resource corresponding to this case, where the operating resource may be a resource preset for this case or an operating resource determined based on other indication information.

When the indication information used to indicate a quantity of the second devices in the cell is included, as the terminal selects one of the second devices, the terminal transmits/receives the first signal to/from the third device in a corresponding operating resource, where the operating resource may be a resource preset for the second device or an operating resource determined based on other indication information.

When the indication information used to indicate identifier information of the second device is included, as the terminal selects the second device, the terminal transmits/receives the first signal to/from the third device in a corresponding operating resource, where the operating resource may be a resource preset for the second device or an operating resource determined based on other indication information.

When the indication information used to indicate an operating status of the second device is included, the operating status indication information indicates a quantity of operating states of the second device, and the terminal may transmit/receive the first signal to/from the third device in a corresponding operating resource.

In some embodiments, there are a plurality of operating states of the second device, and in different operating states, parameters that are changed as to the first signal when the second device forwards the first signal are different from each other.

The parameters that are changed may include, but is not limited to, at least one of the following:

a frequency, an amplitude, a phase, a direction of polarization, or spatial energy distribution of beams.

For example, reflective or refractive properties of wireless signals of the second device in different operating states are different, thereby affecting at least one parameter in the frequency, the amplitude, the phase, the direction of polarization, and the spatial energy distribution of beams.

When the terminal transmits/receives the signal to/from the third device, the transmission may be performed based on parameters in the different operating states to improve reliability of the transmission.

In some embodiments, the indication information used to indicate an operating status of the second device indicates at least one of the following:

a quantity of operating states of the second device;

a manner of modulation of the second device; or time information about the operating status of the second device.

The time information about the operating status of the second device may be time information about each operating state of the second device or time information about a part of operating states of the second device.

The time information may include at least one of the following:

duration, a start time, an end time, a periodicity, or a time granularity.

A time at which the operating status of the second device switches and an effective time domain range may be determined based on the time information, and the time information may indicate an alignment relationship between a time of an operating state of the second device and a frame/slot/symbolic boundary of the first signal, for example, an effective time domain range through channel estimation.

For example, the time information includes duration during which the second device is in an operating state, a start time and an end time, or the start time and a time granularity (or an equivalent expression) of the duration of the operating state. The time information is a unique identifier of a time system, where the time system may be a standard time reference system or a time reference system of radio frames, OFDM symbols, or others. Duration of time during which the second device is in an operating state may be in radio frames, slots, OFDM symbols, or the like.

When the manner of modulation of the second device is indicated, the terminal transmits/receives the first signal to/from the third device based on the manner of modulation in a plurality of corresponding operating states. The plurality of operating states may be preset operating states of the second device, operating states preset for the manner of modulation, or operating states determined based on other indication information.

In some embodiments, the manner of modulation of the second device represents a mapping relationship between sending information and the operating status that are of the second device, where the sending information is sending information used by the second device for forwarding the first signal.

The sending information may be information added when the second device forwards the first signal and may also be referred to as additional information. The additional information is embodied as an electromagnetic signal parameter, for example, a frequency, an amplitude, a phase, a direction of polarization, and spatial energy distribution of beams of the signal, when the second device forwards the first signal. It should be noted that, because the sending information can be used by the second device when forwarding the first signal, there can be higher reliability of transmitting the first signal. The sending information may be inherent information, sensor information, encrypted information, or other information of the second device that can be added in a process of forwarding.

In this way, after determining the manner of modulation, the terminal can precisely determine, based on a change of the operating status of the second device, information added to the first signal by the second device, to precisely obtain effective information.

In some embodiments, in a case in which the time information includes a time granularity, the terminal may perform channel measurement on a wireless channel corresponding to each operating state of the second device at the time granularity to measure channel information in the different operating states of the second device based on the operating parameter indication information of the second device. Further, a measurement result may be reported to the network device, so that the network device uses the measurement result as a reference for scheduling radio resources to enhance effects of scheduling by the network device.

In some embodiments, the indication information used to indicate an operating status of the second device may further indicate at least one of the following:

a periodicity of the operating status of the second device; or a manner of aligning a periodicity of the operating status of the second device with a time resource.

The periodicity may be a periodicity of a part of or all operating states of the second device. The manner of aligning the periodicity with the time resource may be a manner of aligning the periodicity with a frame boundary, a slot boundary, or an OFDM symbol boundary. For example, a start moment of an operating state 0 of the second device is aligned with a start boundary of a $n^{th}$ frame. mod(n,10)=0. A periodicity of the operating state of the second device is 10 radio frames.

In some embodiments, the terminal, based on at least one of the quantity of operating states, the periodicity, or the duration of an operating state that are of the second device, calculates a start time and an end time of each operating state.

Further, the operating status of the second device may be periodic, semi-static, or aperiodic. Therefore, in this embodiment of the present disclosure, operating parameter information indicated by the first device may be periodic, semi-static, or aperiodic operating parameter indication information.

As an optional implementation, the operating resource includes a time resource determined based on the operating parameter indication information.

The time resource may correspond to one or more operating states of the second device. For example, the third device schedules a time resource for the terminal to transmit data, where the time resource may go through a plurality of operating states of the second device. Then, the terminal may receive and process a downlink signal based on the time granularity indicated by the operating parameter indication information.

In an implementation, the time resource may be determined based on a time granularity, where the operating parameter indication information indicates that there is the time granularity.

Different time granularities may correspond to different time resources. There may be a case in which a plurality of time granularities correspond to same time information. This is not specifically limited.

A corresponding relationship between a time granularity and a time resource may be pre-configured, for example, by the network device for the terminal, agreed in advance in a protocol, or the like. The time granularity may be a time granularity in mini-slots, slots, subframes, or radio frames.

In another implementation, the time resource is determined based on a periodicity of an operating status of the second device, where the operating parameter indication information indicates the periodicity of the operating status of the second device.

For example, it is assumed that a quantity of operating states of the first device is 5, and a periodicity is 10 radio frames. In this case, each operating state occupies two radio frames. For another example, it is assumed that a quantity of operating states of the first device is 5, a periodicity is 10 radio frames, duration of an operating state is one radio frame. In this case, each operating state occupies one radio frame, and a total of five radio frames are occupied. An operating state of the first device corresponding to the last five radio frames is an unconfigured state.

The time resource may be implicitly determined based on the time granularity or the periodicity, thereby reducing signaling overheads.

In some embodiments, the transmitting/receiving the first signal to/from the third device via the second device by using an operating resource of the second device includes:

demodulating, in the time resource, based on a channel estimation result, information of the third device carried in the first signal forwarded by the second device, where the channel estimation result is determined based on a reference signal included in the time resource.

The reference signal may be a reference signal sent within the time resource. The information of the third device may be effective information sent by the third device to the first device.

In this implementation, channel estimation can be performed by using a reference signal within a time resource for each operating state, and a received signal within the time resource can be demodulated. For example, the demodulation is performed at a time granularity in mini-slots, slots, subframes, radio frames that corresponds to the time resource.

In addition, in this implementation, for channel estimation results within time resources for different operating states, the terminal may not perform joint channel estimation filtering across the time resources of different operating states.

In some embodiments, if a time granularity of the time resource is greater than a first preset granularity, the channel estimation result is a joint channel estimation result; or if a time granularity of the time resource is less than or equal to the first preset granularity, the channel estimation result is a channel estimation result involving no joint channel estimation; or if a time interval between same operating states of the second device is less than a channel-related time, the channel estimation result is a result of joint channel estimation on the time resource in the same operating states within the channel-related time; or if a time interval between same operating states of the second device is greater than or equal to the channel-related time, the channel estimation result is a channel estimation result involving no joint channel estimation.

The first preset granularity may be a slot or a coarser granularity. In this way, when a time resource for an operating state is a slot or a coarser granularity, the terminal can perform joint channel estimation between slots in time domain on a channel estimation result within the time resource for the operating state to improve accuracy of channel estimation. When a time resource for an operating state is a granularity finer than a slot, the terminal does not perform joint channel estimation between slots in time domain on a channel estimation result within the time resource for the operating state.

The channel-related time may be time duration within which the channel estimation is assumed to remain unchanged. The time interval between same operating states of the first device may be a periodicity of the same operating states.

In this implementation, if the periodicity of the same operating states is shorter than the channel-related time, the terminal can process channel estimation results in the same operating states in different periodicities jointly to improve accuracy of channel estimation.

In some embodiments, the first signal is a downlink signal forwarded by the second device in a first operating state and received in a first operating time resource, and the demodulating, in the time resource, based on a channel estimation result, information of the third device carried in the first signal forwarded by the second device includes:

if a time granularity of the time resource is a second preset granularity, demodulating, by using the first operating time resource, based on a channel estimation result, the information of the third device carried in the first signal forwarded by the second device, where the channel estimation result is determined based on a first reference signal, and the first reference signal is a reference signal corresponding to the first operating time resource in the first operating state.

The second preset granularity may be a granularity in OFDM symbols, or, may be another finer time granularity.

In this implementation, at least one reference signal may be configured for a time resource for each operating state. For example, when a time resource for an operating state of the second device is a granularity in OFDM symbols, the third device may configure at least one reference signal in a time segment of each operating state, by which the terminal performs signal demodulation.

In this embodiment of the present disclosure, the terminal may determine the sending information used by the second device for the first signal, where determining the sending information may be that the sending information superposed on the first signal by the second device is determined based on the change of a channel status detected by the terminal. For example, the terminal detects, based on the time granularity indicated by the operating parameter indication information of the second device, a change of a channel status, and obtains, based on the change, the sending information added by the second device to the first signal.

In an optional implementation, the first signal is a downlink signal forwarded by the second device in a second operating state and received in a second operating time resource, and the method further includes:

determining, based on a channel measurement result, sending information used by the second device for the first signal.

For the sending information, refer to the description of the foregoing implementation. Details are not described herein again.

The channel measurement result may correspond to the change of a channel status. In addition, a plurality of channel measurement results as described above may include measurement results at a plurality of different times in a plurality of operating states of the second device, for example, a measurement result obtained by the first device when forwarding the first signal in an operating state determined according to a training sequence. In this way, the terminal can determine, based on corresponding relationships between measurement results at different times and operating states of the second device, a change of a channel, and then determine the sending information based on modulation manner indication information. For example, when the manner of modulation is differential modulation, the sending information is determined by comparing a channel measurement result at a current time granularity with a channel measurement result at a previous time granularity. In some embodiments, the change of the channel may be determined based on a difference between the measurement results, and the sending information is further determined.

In this implementation, because the sending information used by the second device for the first signal may be determined, the first signal sent by the second device to the terminal can be precisely obtained based on the sending information.

As an optional implementation, the operating parameter indication information includes:

received operating parameter indication information;

operating parameter indication information determined according to a pre-defined operating rule of the second device; or operating parameter indication information determined based on a Quasi Co-Location (QCL) relationship.

The received operating parameter indication information may be sent by the network device. For example, the second device indicates an operating parameter of the second device by using Radio Resource Control (RRC) signaling, a Medium access control-control element (MAC CE), downlink control information (DCI), or a combination thereof.

The received operating parameter indication information may be received from the second device. For example, when the second device has an independent wireless communications module, the first device may send the operating parameter indication information of the second device to the terminal, for example, send the operating parameter indication information of the second device by sidelink or Device-to-Device (D2D) communication.

The operating parameter indication information determined according to the pre-defined operating rule of the second device may be that an operating parameter is determined according to an operating rule of the second device pre-defined in a protocol, where a relationship between the operating rule and the operating parameter may be pre-configured or obtained by the terminal by inferring according to the operating rule.

Figure 3:
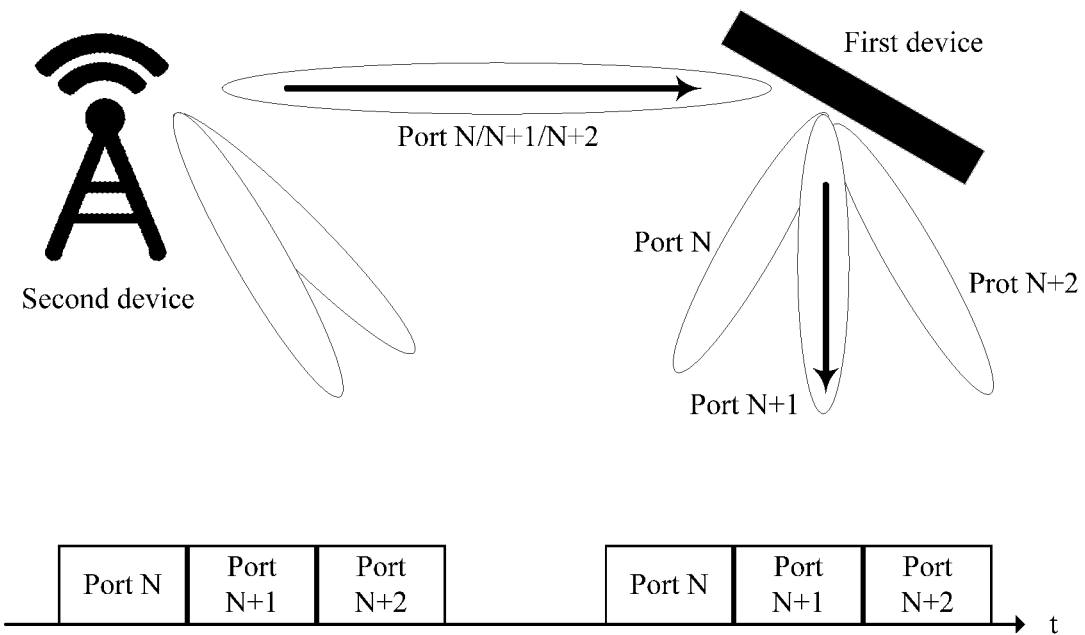
FIG. 3 is a schematic diagram of an application scenario according to an embodiment of the present disclosure.

The operating parameter indication information determined based on the QCL relationship may be that the first device determines an operating parameter of the second device according to the QCL relationship between the different configured ports over different slots. For the third device, signals transmitted over a same port in different time resources have a QCL relationship, so that in different time resources, the second device is in a same operating state for transmitting signals over a same port. Therefore, forwarded signals also have a QCL relationship. In this way, for a same port, the first device may determine, based on operating parameter indication information in an earlier time resource, operating parameter indication information in a subsequent time resource, for example, use the operating parameter indication information in the earlier time resource as the operating parameter indication information in the subsequent time resource. For example, as shown in FIG. 3, the third device and the second device communicate with each other over ports N, N+1, and N+2 separately, and the second device may operate in different operating states for ports N, N+1, and N+2. In this way, the terminal uses operating parameter indication information over the port N in an earlier time resource as operating parameter indication information over the port N in a subsequent time resource.

As an optional implementation, the second device is a device configured to transmit a signal between the first device and the second device, and the first signal is an uplink signal sent by the first device to the third device, or the first signal is a downlink signal sent by the third device to the first device.

In the embodiments of the present disclosure, the operating parameter indication information of the second device is obtained; and the first signal is transmitted/received to/from the third device based on the operating parameter indication information, where that the first signal is transmitted/received to/from the third device includes that the first signal is transmitted/received to/from the third device via the second device, or the first signal is transmitted/received to/from the third device includes that the first signal is transmitted/received to/from the third device directly. In this way, as the first signal is transmitted/received to/from the third device based on the operating parameter indication information of the second device, reliability of signal transmission can be improved.

Figure 4:
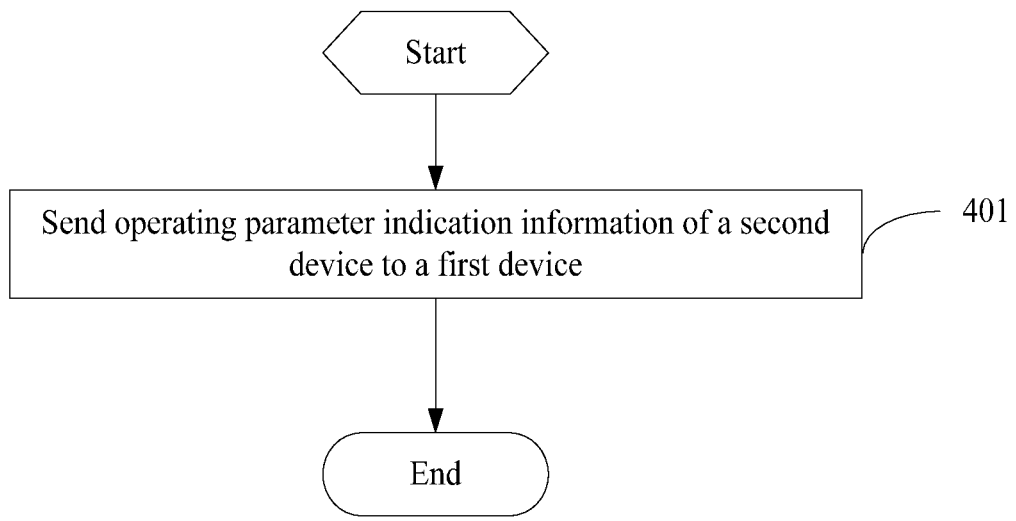
FIG. 4 is a flowchart of an information indication method according to an embodiment of the present disclosure.

Refer to FIG. 4. FIG. 4 is a flowchart of an information indication method according to an embodiment of the present disclosure. The method is performed by a second device or a third device. As shown in FIG. 4, the method includes the following steps:

Step 401: sending operating parameter indication information of the second device to a first device, where the operating parameter indication information is used by the first device to transmit/receive a first signal to/from the third device based on the operating parameter indication information, where that the first device transmits/receives the first signal to/from the third device includes that the first device transmits/receives the first signal to/from the third device via the second device, or that the first device transmits/receives the first signal to/from the third device includes that the first device transmits/receives the first signal to/from the third device directly.

In some embodiments, the operating parameter indication information is used to determine an operating resource the first device transmits/receives the first signal to/from the third device via the second device by using an operating resource of the second device.

In some embodiments, the operating parameter indication information includes at least one of the following:

indication information used to indicate whether there is the second device in a cell;

indication information used to indicate a quantity of the second devices in the cell;

indication information used to indicate identifier information of the second device; or indication information used to indicate an operating status of the second device.

In some embodiments, there are a plurality of operating states of the second device, and in different operating states, parameters that are changed as to the first signal when the second device forwards the first signal are different from each other.

In some embodiments, the parameters that are changed includes at least one of the following:

a frequency, an amplitude, a phase, a direction of polarization, or spatial energy distribution of beams.

In some embodiments, the indication information used to indicate an operating status of the second device indicates at least one of the following:

a quantity of operating states of the second device;

a manner of modulation of the second device; or time information about the operating status of the second device.

In some embodiments, the time information includes at least one of the following:

duration, a start time, an end time, a periodicity, or a time granularity; and/or the manner of modulation of the second device represents a mapping relationship between sending information and the operating status that are of the second device, where the sending information is sending information used by the second device for forwarding the first signal.

In some embodiments, the operating resource includes a time resource determined based on the operating parameter indication information.

In some embodiments, the time resource is determined based on a time granularity, where the operating parameter indication information indicates that there is the time granularity; or the time resource is determined based on a periodicity of an operating status of the second device, where the operating parameter indication information indicates the periodicity of the operating status of the second device.

In some embodiments, the second device is a device configured to transmit a signal between the first device and the second device, and the first signal is an uplink signal sent by the first device to the third device, or the first signal is a downlink signal sent by the third device to the first device.

In some embodiments, in a case in which the method is performed by the third device, the method further includes:

scheduling, based on the operating parameter indication information, transmission of the first signal.

The scheduling may be that time and frequency resources of one or more time granularities are scheduled at a time for transmission.

In some embodiments, the first device includes a network device, a Wi-Fi device, or a terminal; and/or the second device includes a large intelligent surface LIS, a backscatter, a Wi-Fi device, or a relay device; and/or the third device includes a terminal, a Wi-Fi device, or a network device.

It should be noted that this embodiment is used as an implementation of the communications device corresponding to the embodiment shown in FIG. 2. For a specific implementation, refer to the related description in the embodiment shown in FIG. 2. To avoid repeated description, details are not described again in this embodiment. In this embodiment, the reliability of signal transmission can also be improved.

Figure 5:
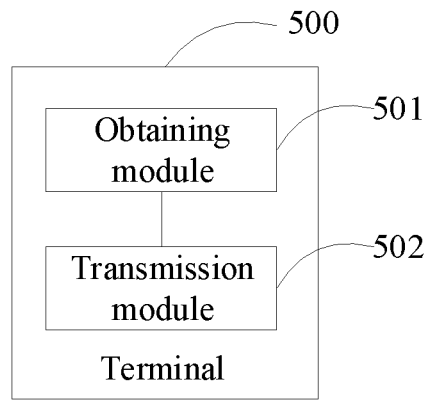
FIG. 5 is a structural diagram of a communications device according to an embodiment of the present disclosure.

Refer to FIG. 5. FIG. 5 is a structural diagram of a communications device according to an embodiment of the present disclosure. The communications device is a first device. As shown in FIG. 5, a communications device 500 (that may be, for example, a terminal) includes:

an obtaining module 501, configured to obtain operating parameter indication information of a second device; and a transmission module 502, configured to transmit/receive a first signal to/from a third device based on the operating parameter indication information.

To transmit/receive a first signal to/from a third device includes transmitting/receiving the first signal to/from the third device via the second device, or to transmit/receive a first signal to/from a third device includes transmitting/receiving the first signal to/from the third device directly.

In some embodiments, the transmission module 502 is configured to transmit/receive the first signal to/from the third device via the second device by using an operating resource of the second device, where the operating resource is determined based on the operating parameter indication information.

In some embodiments, the operating parameter indication information includes at least one of the following:

indication information used to indicate whether there is the second device in a cell;

indication information used to indicate a quantity of the second devices in the cell;

indication information used to indicate identifier information of the second device; or indication information used to indicate an operating status of the second device.

In some embodiments, there are a plurality of operating states of the second device, and in different operating states, parameters that are changed as to the first signal when the second device forwards the first signal are different from each other.

In some embodiments, the parameters that are changed includes at least one of the following:

a frequency, an amplitude, a phase, a direction of polarization, or spatial energy distribution of beams.

In some embodiments, the indication information used to indicate an operating status of the second device indicates at least one of the following:

a quantity of operating states of the second device;

a manner of modulation of the second device; or time information about the operating status of the second device.

In some embodiments, the operating resource includes a time resource determined based on the operating parameter indication information.

In some embodiments, the time information includes at least one of the following:

duration, a start time, an end time, a periodicity, or a time granularity; and/or the manner of modulation of the second device represents a mapping relationship between sending information and the operating status that are of the second device, where the sending information is sending information used by the second device for forwarding the first signal.

In some embodiments, the operating resource includes a time resource determined based on the operating parameter indication information.

In some embodiments, the transmitting/receiving the first signal to/from the third device via the second device by using an operating resource of the second device includes:

demodulating, in the time resource, based on a channel estimation result, information of the third device carried in the first signal forwarded by the second device, where the channel estimation result is determined based on a reference signal included in the time resource.

In some embodiments, if a time granularity of the time resource is greater than a first preset granularity, the channel estimation result is a joint channel estimation result; or if a time granularity of the time resource is less than or equal to the first preset granularity, the channel estimation result is a channel estimation result involving no joint channel estimation; or if a time interval between same operating states of the second device is less than a channel-related time, the channel estimation result is a result of joint channel estimation on the time resource in the same operating states within the channel-related time; or if a time interval between same operating states of the second device is greater than or equal to the channel-related time, the channel estimation result is a channel estimation result involving no joint channel estimation.

In some embodiments, the first signal is a downlink signal forwarded by the second device in a first operating state and received in a first operating time resource, and the demodulating, in the time resource, based on a channel estimation result, information of the third device carried in the first signal forwarded by the second device includes:

if a time granularity of the time resource is a second preset granularity, demodulating, by using the first operating time resource, based on a channel estimation result, the information of the third device carried in the first signal forwarded by the second device, where the channel estimation result is determined based on a first reference signal, and the first reference signal is a reference signal corresponding to the first operating time resource in the first operating state.

In some embodiments, the first signal is a downlink signal forwarded by the second device in a second operating state and received in a second operating time resource, and the first device further includes:

a determining module, configured to determine, based on a channel measurement result, sending information used by the second device for the first signal.

In some embodiments, the operating parameter indication information includes:

received operating parameter indication information;

operating parameter indication information determined according to a pre-defined operating rule of the second device; or operating parameter indication information determined based on a quasi-colocation QCL relationship.

In some embodiments, the second device is a device configured to transmit a signal between the first device and the second device, and the first signal is an uplink signal sent by the first device to the third device, or the first signal is a downlink signal sent by the third device to the first device.

In some embodiments, the first device includes a network device, a Wi-Fi device, or a terminal; and/or the second device includes a large intelligent surface LIS, a backscatter, a Wi-Fi device, or a relay device; and/or the third device includes a terminal, a Wi-Fi device, or a network device.

The communications device provided in this embodiment of the present disclosure can implement processes implemented by the communications device in the method embodiment of FIG. 2. To avoid repetition, details are not described herein again. In addition, reliability of signal transmission can be improved.

Figure 6:
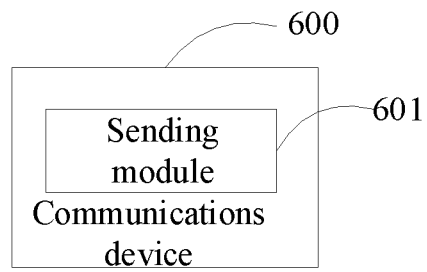
FIG. 6 is a structural diagram of another communications device according to an embodiment of the present disclosure.

Refer to FIG. 6. FIG. 6 is a structural diagram of a communications device according to an embodiment of the present disclosure. The communications device is a second device or a third device. As shown in FIG. 6, a communications device 600 (that may be, for example, a network device) includes:

a sending module 601, configured to send operating parameter indication information of the second device to a first device, where the operating parameter indication information is used by the first device to transmit/receive a first signal to/from the third device based on the operating parameter indication information, where that the first device transmits/receives the first signal to/from the third device includes that the first device transmits/receives the first signal to/from the third device via the second device, or that the first device transmits/receives the first signal to/from the third device includes that the first device transmits/receives the first signal to/from the third device directly.

In some embodiments, the operating parameter indication information is used to determine an operating resource the first device transmits/receives the first signal to/from the third device via the second device by using an operating resource of the second device.

In some embodiments, the operating parameter indication information includes at least one of the following:

indication information used to indicate whether there is the second device in a cell;

indication information used to indicate a quantity of the second devices in the cell;

indication information used to indicate identifier information of the second device; or indication information used to indicate an operating status of the second device.

In some embodiments, there are a plurality of operating states of the second device, and in different operating states, parameters that are changed as to the first signal when the second device forwards the first signal are different from each other.

In some embodiments, the parameters that are changed includes at least one of the following:

a frequency, an amplitude, a phase, a direction of polarization, or spatial energy distribution of beams.

In some embodiments, the indication information used to indicate an operating status of the second device indicates at least one of the following:

a quantity of operating states of the second device;

a manner of modulation of the second device; or time information about the operating status of the second device.

In some embodiments, the time information includes at least one of the following:

a duration time, a start time, an end time, a periodicity, or a time granularity; and/or the manner of modulation of the second device represents a mapping relationship between sending information and the operating status that are of the second device, where the sending information is sending information used by the second device for forwarding the first signal.

In some embodiments, the operating resource includes a time resource determined based on the operating parameter indication information.

In some embodiments, the time resource is determined based on a time granularity, where the operating parameter indication information indicates that there is the time granularity; or the time resource is determined based on a periodicity of an operating status of the second device, where the operating parameter indication information indicates the periodicity of the operating status of the second device.

In some embodiments, the second device is a device configured to transmit a signal between the first device and the second device, and the first signal is an uplink signal sent by the first device to the third device, or the first signal is a downlink signal sent by the third device to the first device.

Figure 7:
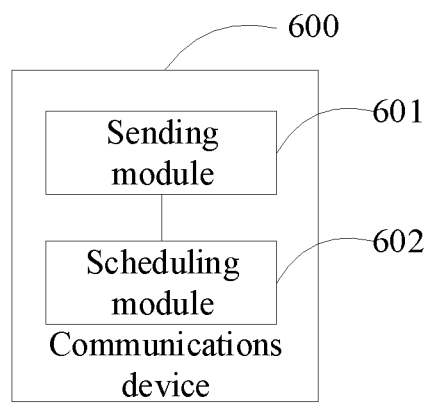
FIG. 7 is a structural diagram of another communications device according to an embodiment of the present disclosure.

In some embodiments, in a case in which the communications device is the third device, as shown in FIG. 7, the communications device 600 further includes:

a scheduling module 602, configured to schedule, based on the operating parameter indication information, transmission of the first signal.

In some embodiments, the first device includes a network device, a Wi-Fi device, or a terminal; and/or the second device includes a large intelligent surface LIS, a backscatter, a Wi-Fi device, or a relay device; and/or the third device includes a terminal, a Wi-Fi device, or a network device.

The communications device provided in this embodiment of the present disclosure can implement processes implemented by the communications device in the method embodiment of FIG. 4. To avoid repetition, details are not described herein again. In addition, reliability of signal transmission can be improved.

Figure 8:
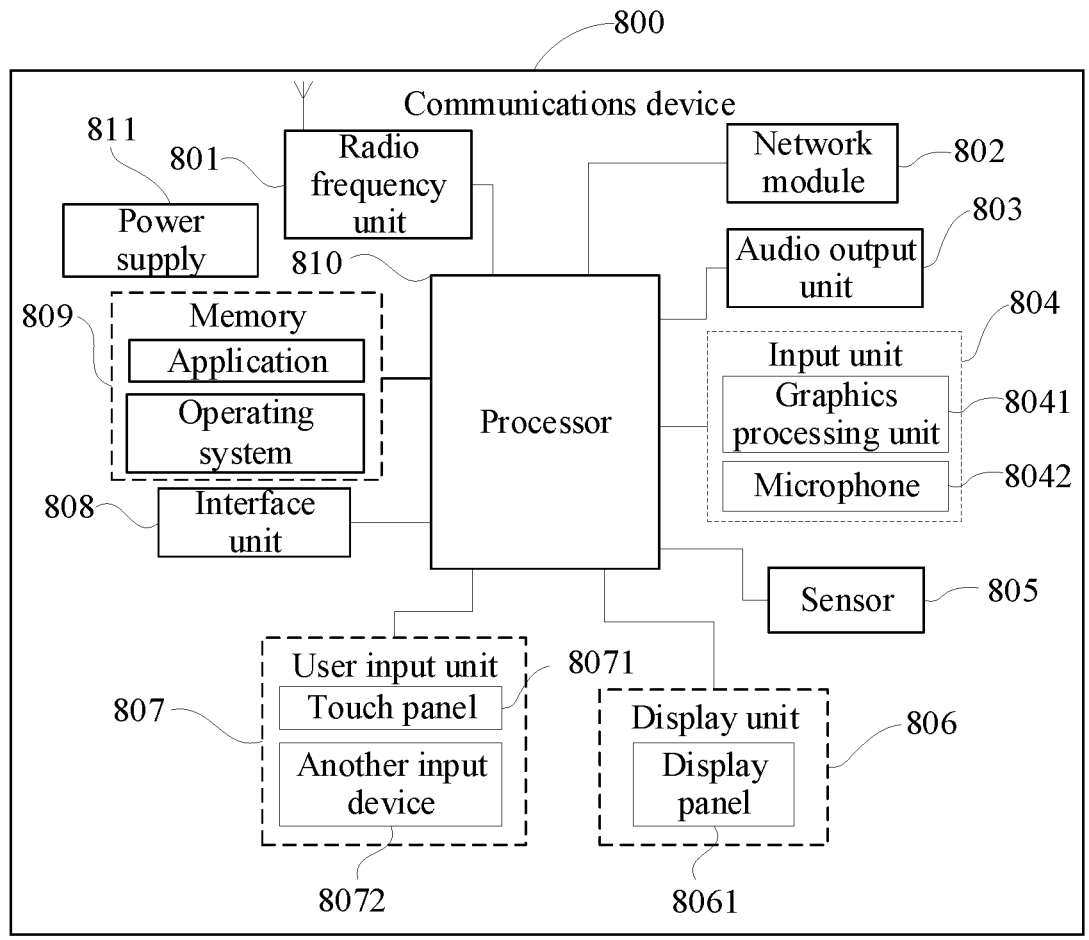
FIG. 8 is a structural diagram of another communications device according to an embodiment of the present disclosure.

FIG. 8 is a schematic structural diagram of hardware of a communications device implementing the embodiments of the present disclosure. The communications device is a first device. The communications device 800 (that may be, for example, a terminal) includes, but is not limited to, a radio frequency unit 801, a network module 802, an audio output unit 803, an input unit 804, a sensor 805, a display unit 806, a user input unit 807, an interface unit 808, a memory 809, a processor 810, a power supply 811, and other components. It can be understood by those skilled in the art that, the structure of the communications device shown in FIG. 8 does not constitute any limitation on the communications device, and the communications device may include more or fewer components than those shown in the figure, or combine some components, or have different component arrangements. In this embodiment of the present disclosure, the communications device includes, but is not limited to, a mobile phone, a tablet computer, a laptop computer, a palmtop computer, a vehicle-mounted terminal, a robot, a wearable device, a pedometer, and the like.

The radio frequency unit 801 is configured to obtain operating parameter indication information of a second device.

The radio frequency unit 801 is configured to transmit/receive a first signal to/from a third device based on the operating parameter indication information.

To transmit/receive a first signal to/from a third device includes transmitting/receiving the first signal to/from the third device via the second device, or to transmit/receive a first signal to/from a third device includes transmitting/receiving the first signal to/from the third device directly.

In some embodiments, to transmit/receive a first signal to/from a third device based on the operating parameter indication information includes:

transmitting/receiving the first signal to/from the third device via the second device by using an operating resource of the second device, where the operating resource is determined based on the operating parameter indication information.

In some embodiments, the operating parameter indication information includes at least one of the following:

indication information used to indicate whether there is the second device in a cell;

indication information used to indicate a quantity of the second devices in the cell;

indication information used to indicate identifier information of the second device; or indication information used to indicate an operating status of the second device.

In some embodiments, there are a plurality of operating states of the second device, and in different operating states, parameters that are changed as to the first signal when the second device forwards the first signal are different from each other.

In some embodiments, the parameters that are changed includes at least one of the following:

a frequency, an amplitude, a phase, a direction of polarization, or spatial energy distribution of beams.

In some embodiments, the indication information used to indicate an operating status of the second device indicates at least one of the following:

a quantity of operating states of the second device;

a manner of modulation of the second device; or time information about the operating status of the second device.

In some embodiments, the time information includes at least one of the following:

duration, a start time, an end time, a periodicity, or a time granularity; and/or the manner of modulation of the second device represents a mapping relationship between sending information and the operating status that are of the second device, where the sending information is sending information used by the second device for forwarding the first signal.

In some embodiments, the operating resource includes a time resource determined based on the operating parameter indication information.

In some embodiments, the time resource is determined based on a time granularity, where the operating parameter indication information indicates that there is the time granularity; or the time resource is determined based on a periodicity of an operating status of the second device, where the operating parameter indication information indicates the periodicity of the operating status of the second device.

In some embodiments, the transmitting/receiving the first signal to/from the third device via the second device by using an operating resource of the second device includes:

demodulating, in the time resource, based on a channel estimation result, information of the third device carried in the first signal forwarded by the second device, where the channel estimation result is determined based on a reference signal included in the time resource.

In some embodiments, if a time granularity of the time resource is greater than a first preset granularity, the channel estimation result is a joint channel estimation result; or if a time granularity of the time resource is less than or equal to the first preset granularity, the channel estimation result is a channel estimation result involving no joint channel estimation; or if a time interval between same operating states of the second device is less than a channel-related time, the channel estimation result is a result of joint channel estimation on the time resource in the same operating states within the channel-related time; or if a time interval between same operating states of the second device is greater than or equal to the channel-related time, the channel estimation result is a channel estimation result involving no joint channel estimation.

In some embodiments, the first signal is a downlink signal forwarded by the second device in a first operating state and received in a first operating time resource, and the demodulating, in the time resource, based on a channel estimation result, information of the third device carried in the first signal forwarded by the second device includes:

if a time granularity of the time resource is a second preset granularity, demodulating, by using the first operating time resource, based on a channel estimation result, the information of the third device carried in the first signal forwarded by the second device, where the channel estimation result is determined based on a first reference signal, and the first reference signal is a reference signal corresponding to the first operating time resource in the first operating state.

In some embodiments, the first signal is a downlink signal forwarded by the second device in a second operating state and received in a second operating time resource, and the processor 810 is configured to:

determine, based on a channel measurement result, sending information used by the second device for the first signal.

In some embodiments, the operating parameter indication information includes:

received operating parameter indication information;

operating parameter indication information determined according to a pre-defined operating rule of the second device; or operating parameter indication information determined based on a quasi-colocation QCL relationship.

In some embodiments, the second device is a device configured to transmit a signal between the first device and the second device, and the first signal is an uplink signal sent by the first device to the third device, or the first signal is a downlink signal sent by the third device to the first device.

In some embodiments, the first device includes a network device, a Wi-Fi device, or a terminal; and/or the second device includes a large intelligent surface LIS, a backscatter, a Wi-Fi device, or a relay device; and/or the third device includes a terminal, a Wi-Fi device, or a network device.

The terminal can help improve reliability of signal transmission.

It should be understood that, in this embodiment of the present disclosure, the radio frequency unit 801 may be configured to receive and send information or a signal in a call process. In some embodiments, after receiving downlink data from a base station, the radio frequency unit 801 sends the downlink data to the processor 810 for processing. In addition, the radio frequency unit 801 sends uplink data to the base station. Usually, the radio frequency unit 801 includes, but is not limited to, an antenna, at least one amplifier, a transceiver, a coupler, a low noise amplifier, a duplexer, and the like. In addition, the radio frequency unit 801 may communicate with a network and another device through a wireless communications system.

The communications device provides wireless broadband Internet access for a user by using the network module 802, for example, help the user transmit and receive an e-mail, browse a website, and access stream media.

The audio output unit 803 may convert audio data received by the radio frequency unit 801 or the network module 802 or stored in the memory 809 into an audio signal and output the audio signal as a sound. In addition, the audio output unit 803 may further provide an audio output (for example, a call signal received voice, or a message received voice) related to a specific function implemented by the communications device 800. The audio output unit 803 includes a speaker, a buzzer, a telephone receiver, and the like.

The input unit 804 is configured to receive an audio signal or a video signal. The input unit 804 may include a Graphics Processing Unit (GPU) 8041 and a microphone 8042. The graphics processing unit 8041 processes image data of a static image or video obtained by an image capture apparatus (for example, a camera) in a video capture mode or an image capture mode. A processed image frame may be displayed on the display unit 806. The image frame processed by the graphics processing unit 8041 may be stored in the memory 809 (or another storage medium) or sent by using the radio frequency unit 801 or the network module 802. The microphone 8042 may receive a sound and can process such sound into audio data. Processed audio data may be converted, in a call mode, into a format that can be sent to a mobile communication base station by using the radio frequency unit 801 for output.

The communications device 800 further includes at least one sensor 805, such as an optical sensor, a motion sensor, and other sensors. In some embodiments, the optical sensor includes an ambient light sensor and a proximity sensor. The ambient light sensor may adjust luminance of the display panel 8061 based on brightness of ambient light, and the proximity sensor may disable the display panel 8061 and/or back light when the communications device 800 approaches an ear. As a type of the motion sensor, an accelerometer sensor may detect an acceleration value in each direction (generally, three axes), and detect a value and a direction of gravity when the accelerometer sensor is static, and may be used in an application for recognizing a posture of the communications device (such as screen switching between landscape and portrait modes, a related game, or magnetometer posture calibration), a function related to vibration recognition (such as a pedometer or a knock), and the like. The sensor 805 may further include a fingerprint sensor, a pressure sensor, an iris sensor, a molecular sensor, a gyroscope, a barometer, a hygrometer, a thermometer, an infrared sensor, and the like. Details are not described herein.

The display unit 806 is configured to display information input by a user or information provided for a user. The display unit 806 may include a display panel 8061. The display panel 8061 may be configured in a form of a Liquid Crystal Display (LCD), an Organic Light-Emitting Diode (OLED), or the like.

The input unit 807 may be configured to receive input numeral or character information, and generate key signal input related to user setting and function control that are of the communications device. In some embodiments, the user input unit 807 includes a touch panel 8071 and another input device 8072. The touch panel 8071 is also referred to as a touchscreen, and may collect a touch operation performed by a user on or near the touch panel 8071 (for example, an operation performed by a user on the touch panel 8071 or near the touch panel 8071 by using any proper object or accessory, for example, a finger or a stylus). The touch panel 8071 may include two parts: a touch detection apparatus and a touch controller. The touch detection apparatus detects a touch location of the user, detects a signal brought by the touch operation, and sends the signal to the touch controller. The touch controller receives touch information from the touch detection apparatus, converts the touch information into touch point coordinates, and sends the touch point coordinates to the processor 810, and receives and executes a command sent by the processor 810. In addition, the touch panel 8071 may be implemented by using a plurality of types such as a resistive type, a capacitive type, an infrared ray, and a surface acoustic wave. The user input unit 807 may include other input devices 8072 in addition to the touch panel 8071. In some embodiments, the another input device 8072 may include, but is not limited to, a physical keyboard, a function button (such as a volume control button, a switch button), a trackball, a mouse, and a joystick, which is not described herein.

Further, the touch panel 8071 may cover the display panel 8061. After detecting the touch operation on or near the touch panel 8071, the touch panel 8071 transmits the touch operation to the processor 810 to determine a type of a touch event, and then the processor 810 provides corresponding visual output on the display panel 8061 based on the type of the touch event. In FIG. 8, although the touch panel 8071 and the display panel 8061 are used as two independent parts to implement input and output functions of the communications device, in some embodiments, the touch panel 8071 and the display panel 8061 may be integrated to implement the input and output functions of the communications device. This is not specifically limited herein.

The interface unit 808 is an interface for connecting an external apparatus and the communications device 800. For example, the external apparatus may include a wired or wireless headset jack, an external power supply (or a battery charger) port, a wired or wireless data port, a storage card port, a port for connecting an apparatus having an identification module, an audio input/output (I/O) port, a video I/O port, a headset jack, or the like. The interface unit 808 may be configured to receive input (for example, data information and power) from an external apparatus and transmit the received input to one or more elements in the communications device 800 or may be configured to transmit data between the communications device 800 and an external apparatus.

The memory 809 may be configured to store a software program and various data. The memory 809 may mainly include a program storage area and a data storage area. The program storage area may store an operating system, an application required by at least one function (for example, a sound play function or an image display function), and the like. The data storage area may store data (for example, audio data or an address book) or the like created based on use of the mobile phone. In addition, the memory 809 may include a high-speed random access memory, and may further include a nonvolatile memory, for example, at least one magnetic disk storage device, a flash storage device, or another volatile solid-state storage device.

The processor 810 is a control center of the communications device, is connected to all parts of the entire communications device by using various interfaces and lines, and executes various functions of the communications device and processes data by running or executing the software program and/or the module stored in the memory 809 and by invoking data stored in the memory 809, so as to perform overall monitoring on the communications device. The processor 810 may include one or more processing units. In some embodiments, an application processor and a modem processor may be integrated into the processor 810. The application processor mainly processes an operating system, a user interface, an application, and the like. The modem processor mainly processes wireless communications. It can be understood that, the modem processor may not be integrated into the processor 810.

The communications device 800 may further include the power supply 811 (for example, a battery) that supplies power to the components. In some embodiments, the power supply 811 may be logically connected to the processor 810 by using a power supply management system, so as to implement functions, such as charging and discharging management and power consumption management by using the power supply management system.

In addition, the communications device 800 includes some function modules not shown, and details are not described herein.

The embodiments of the present disclosure further provide a communications device, including a processor 810, a memory 809, and a computer program stored in the memory 809 and executable on the processor 810. When the computer program is executed by the processor 810, processes of the foregoing embodiment of the signal transmission method are implemented, and same technical effects can be achieved. To avoid repetition, details are not described herein again.

Figure 9:
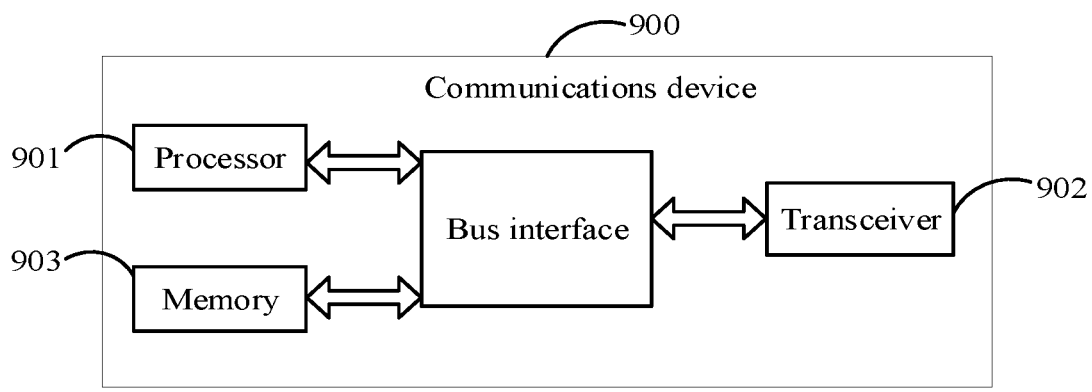
FIG. 9 is a structural diagram of another communications device according to an embodiment of the present disclosure.

Refer to FIG. 9. FIG. 9 is a structural diagram of another communications device according to an embodiment of the present disclosure. The communications device is a second device or a third device. As shown in FIG. 9, the communications device 900 includes a processor 901, a transceiver 902, a memory 903, and bus interface.

The transceiver 902 is configured to send operating parameter indication information of the second device to a first device, where the operating parameter indication information is used by the first device to transmit/receive a first signal to/from the third device based on the operating parameter indication information, where that the first device transmits/receives the first signal to/from the third device includes that the first device transmits/receives the first signal to/from the third device via the second device, or that the first device transmits/receives the first signal to/from the third device includes that the first device transmits/receives the first signal to/from the third device directly.

In some embodiments, the operating parameter indication information is used to determine an operating resource the first device transmits/receives the first signal to/from the third device via the second device by using an operating resource of the second device.

In some embodiments, the operating parameter indication information includes at least one of the following:

indication information used to indicate whether there is the second device in a cell;

indication information used to indicate a quantity of the second devices in the cell;

indication information used to indicate identifier information of the second device; or indication information used to indicate an operating status of the second device.

In some embodiments, there are a plurality of operating states of the second device, and in different operating states, parameters that are changed as to the first signal when the second device forwards the first signal are different from each other.

In some embodiments, the parameters that are changed includes at least one of the following:

a frequency, an amplitude, a phase, a direction of polarization, or spatial energy distribution of beams.

In some embodiments, the indication information used to indicate an operating status of the second device indicates at least one of the following:

a quantity of operating states of the second device;

a manner of modulation of the second device; or time information about the operating status of the second device.

In some embodiments, the time information includes at least one of the following:

duration, a start time, an end time, a periodicity, or a time granularity; and/or the manner of modulation of the second device represents a mapping relationship between sending information and the operating status that are of the second device, where the sending information is sending information used by the second device for forwarding the first signal.

In some embodiments, the operating resource includes a time resource determined based on the operating parameter indication information.

In some embodiments, the time resource is determined based on a time granularity, where the operating parameter indication information indicates that there is the time granularity; or the time resource is determined based on a periodicity of an operating status of the second device, where the operating parameter indication information indicates the periodicity of the operating status of the second device.

In some embodiments, the second device is a device configured to transmit a signal between the first device and the second device, and the first signal is an uplink signal sent by the first device to the third device, or the first signal is a downlink signal sent by the third device to the first device.

In some embodiments, in a case in which the communications device is the third device, the transceiver 902 is further configured to:

schedule, based on the operating parameter indication information, transmission of the first signal.

In some embodiments, the first device includes a network device, a Wi-Fi device, or a terminal; and/or the second device includes a large intelligent surface LIS, a backscatter, a Wi-Fi device, or a relay device; and/or the third device includes a terminal, a Wi-Fi device, or a network device.

The communications device can help improve reliability of signal transmission.

The transceiver 902 is configured to receive and transmit data under the control of the processor 901. The transceiver 902 includes at least two antenna ports.

In FIG. 9, a bus architecture may include any quantity of interconnected buses and bridges, and is linked by various circuits of one or more processors represented by the processor 901 and a memory represented by the memory 903. The bus architecture may further link various other circuits such as a peripheral device, a voltage regulator, and a power management circuit together. These are all well-known in the art, and therefore are not further described in this specification. The bus interface provides interfaces. The transceiver 902 may be a plurality of elements, in other words, includes a transmitter and a receiver, and provides a unit configured to communicate with various other apparatuses on a transmission medium. For different user equipment, the user interface 904 may be further an interface capable of connecting externally and internally a required device. The connected device includes, but is not limited to, a keypad, a display, a speaker, a microphone, a joystick, and the like.

The processor 901 is responsible for managing the bus architecture and common processing, and the memory 903 may store data used when the processor 901 performs an operation.

The embodiments of the present disclosure further provide a communications device, including a processor 901, a memory 903, and a computer program stored in the memory 903 and executable on the processor 901. When the computer program is executed by the processor 901, processes of the foregoing embodiment of the information indication method are implemented, and same technical effects can be achieved. To avoid repetition, details are not described herein again.

An embodiment of the present disclosure provides a computer-readable storage medium, where the computer-readable storage medium stores a computer program. When the computer program is executed by a processor, steps of the signal transmission method provided in the embodiments of the present disclosure are implemented, or when the computer program is executed by a processor, steps of the information indication method provided in the embodiments of the present disclosure are implemented, and same technical effects can be achieved. To avoid repetition, details are not described herein again. The computer-readable storage medium includes a Read-Only Memory (ROM), a Random Access Memory (RAM), a magnetic disk, an optical disc, or the like.

It should be noted that, in this specification, the terms "include", "include", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element.

Based on the description of the foregoing implementations, those skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of the present disclosure.

The embodiments of the present disclosure are described with reference to the accompanying drawings. However, the present disclosure is not limited to the foregoing specific implementations. The foregoing specific implementations are merely examples, but are not limiting. Those of ordinary skill in the art may make many forms without departing from the objective and the scope of the claims of the present disclosure, and these forms all fall within the protection scope of the present disclosure.

What is claimed is:

1. A signal transmission method, performed by a first device, comprising:

obtaining operating parameter indication information of a second device, wherein the operating parameter indication information comprises indication information used to indicate an operating state of the second device; and transmitting/receiving a first signal to/from a third device based on the operating parameter indication information,
wherein the transmitting/receiving a first signal to/from a third device comprises transmitting/receiving the first signal to/from the third device via the second device, or the transmitting/receiving a first signal to/from a third device comprises transmitting/receiving the first signal to/from the third device directly,
wherein the second device has a plurality of operating states, each operating state corresponding to a different way the second device changes a parameter of the first signal when the first signal is transmitted/received via the second device, wherein the parameter comprises at least one of the following: a frequency, a phase, or a direction of polarization.

2. The signal transmission method according to claim 1, wherein the transmitting/receiving a first signal to/from a third device based on the operating parameter indication information comprises:
transmitting/receiving the first signal to/from the third device via the second device by using an operating resource of the second device, wherein the operating resource is determined based on the operating parameter indication information.

3. The signal transmission method according to claim 2, wherein the operating resource comprises a time resource determined based on the operating parameter indication information.

4. The signal transmission method according to claim 3, wherein the time resource is determined based on a time granularity, wherein the operating parameter indication information indicates that there is the time granularity; or
the time resource is determined based on a periodicity of an operating status of the second device, wherein the operating parameter indication information indicates the periodicity of the operating status of the second device.

5. The signal transmission method according to claim 3, wherein the transmitting/receiving the first signal to/from the third device via the second device by using an operating resource of the second device comprises:
demodulating, in the time resource, based on a channel estimation result, information of the third device carried in the first signal forwarded by the second device, wherein the channel estimation result is determined based on a reference signal comprised in the time resource.

6. The signal transmission method according to claim 5, wherein:
when a time granularity of the time resource is greater than a first preset granularity, the channel estimation result is a joint channel estimation result;
when a time granularity of the time resource is less than or equal to the first preset granularity, the channel estimation result is a channel estimation result involving no joint channel estimation;
when a time interval between same operating states of the second device is less than a channel-related time, the channel estimation result is a result of joint channel estimation on the time resource in the same operating states within the channel-related time; or
when a time interval between same operating states of the second device is greater than or equal to the channel-related time, the channel estimation result is a channel estimation result involving no joint channel estimation.

7. The signal transmission method according to claim 5, wherein the first signal is a downlink signal forwarded by the second device in a first operating state and received in a first operating time resource, and the demodulating, in the time resource, based on a channel estimation result, information of the third device carried in the first signal forwarded by the second device comprises:
when a time granularity of the time resource is a second preset granularity, demodulating, by using the first operating time resource, based on a channel estimation result, the information of the third device carried in the first signal forwarded by the second device, wherein the channel estimation result is determined based on a first reference signal, and the first reference signal is a reference signal corresponding to the first operating time resource in the first operating state.

8. The signal transmission method according to claim 3, wherein the first signal is a downlink signal forwarded by the second device in a second operating state and received in a second operating time resource, and the method further comprises:
determining, based on a channel measurement result, sending information used by the second device for the first signal.

9. The signal transmission method according to claim 1, wherein the operating parameter indication information further comprises at least one of the following:
indication information used to indicate whether there is the second device in a cell;
indication information used to indicate a quantity of the second devices in the cell; or
indication information used to indicate identifier information of the second device.

10. The signal transmission method according to claim 1, wherein the parameter further comprise at least one of the following:
an amplitude, or spatial energy distribution of beams.

11. The signal transmission method according to claim 1, wherein the indication information used to indicate an operating status of the second device indicates at least one of the following:
a quantity of operating states of the second device;
a manner of modulation of the second device; or
time information about the operating status of the second device.

12. The signal transmission method according to claim 11, wherein the time information comprises at least one of the following:
duration, a start time, an end time, a periodicity, or a time granularity; or
wherein the manner of modulation of the second device represents a mapping relationship between sending information and the operating status that are of the second device, wherein the sending information is sending information used by the second device for forwarding the first signal.

13. The signal transmission method according to claim 1, wherein the operating parameter indication information further comprises:
received operating parameter indication information;
operating parameter indication information determined according to a pre-defined operating rule of the second device; or
operating parameter indication information determined based on a quasi-colocation (QCL) relationship.

14. The signal transmission method according to claim 1, wherein the second device is a device configured to transmit a signal between the first device and the second device, and the first signal is an uplink signal sent by the first device to the third device, or the first signal is a downlink signal sent by the third device to the first device.

15. The signal transmission method according to claim 1, wherein:
   the first device comprises one of a network device, a Wi-Fi device, or a terminal;
   the second device comprises one of a large intelligent surface (LIS), a backscatter, a Wi-Fi device, or a relay device; and
   the third device comprises one of a terminal, a Wi-Fi device, or a network device.

16. A communication device, wherein the communication device is a first device, comprising:
   a memory storing a computer program; and
   a processor coupled to the memory and configured to execute the computer program to perform operations comprising:
      obtaining operating parameter indication information of a second device, wherein the operating parameter indication information comprises indication information used to indicate an operating state of the second device; and
      transmitting/receiving a first signal to/from a third device based on the operating parameter indication information,
      wherein the transmitting/receiving a first signal to/from a third device comprises transmitting/receiving the first signal to/from the third device via the second device, or the transmitting/receiving a first signal to/from a third device comprises transmitting/receiving the first signal to/from the third device directly,
      wherein the second device has a plurality of operating states, each operating state corresponding to a different way the second device changes a parameter of the first signal when the first signal is transmitted/received via the second device, wherein the parameter comprises at least one of the following: a frequency, a phase, or a direction of polarization.

17. The communication device according to claim 16, wherein the transmitting/receiving a first signal to/from a third device based on the operating parameter indication information comprises:
   transmitting/receiving the first signal to/from the third device via the second device by using an operating resource of the second device, wherein the operating resource is determined based on the operating parameter indication information.

18. The communication device according to claim 16, wherein the operating parameter indication information further comprises at least one of the following:
   indication information used to indicate whether there is the second device in a cell;
   indication information used to indicate a quantity of the second devices in the cell; or
   indication information used to indicate identifier information of the second device.

19. A communication device, wherein the communication device is a second device, comprising:
   a memory storing a computer program; and
   a processor coupled to the memory and configured to execute the computer program to perform operations comprising:
      sending operating parameter indication information of the second device to a first device, wherein the operating parameter indication information comprises indication information used to indicate an operating state of the second device and the operating parameter indication information is used by the first device to transmit/receive a first signal to/from a third device based on the operating parameter indication information, wherein:
      that the first device transmits/receives the first signal to/from the third device comprises that the first device transmits/receives the first signal to/from the third device via the second device; or
      that the first device transmits/receives the first signal to/from the third device comprises that the first device transmits/receives the first signal to/from the third device directly,
      wherein the second device has a plurality of operating states, each operating state corresponding to a different way the second device changes a parameter of the first signal when the first signal is transmitted/received via the second device, wherein the parameter comprises at least one of the following: a frequency, a phase, or a direction of polarization.

* * * * *